(12) United States Patent
Inagawa

(10) Patent No.: US 10,150,301 B2
(45) Date of Patent: Dec. 11, 2018

(54) INKJET PRINTER WITH DENSITY CORRECTION FUNCTION

(71) Applicant: RISO KAGAKU CORPORATION, Tokyo (JP)

(72) Inventor: Hironori Inagawa, Ibaraki (JP)

(73) Assignee: RISO KAGAKU CORPORATION, Tokyo (JP)

(*) Notice: Subject to any disclaimer, the term of this patent is extended or adjusted under 35 U.S.C. 154(b) by 0 days.

(21) Appl. No.: 15/426,342

(22) Filed: Feb. 7, 2017

(65) Prior Publication Data

US 2017/0232758 A1    Aug. 17, 2017

(30) Foreign Application Priority Data

Feb. 16, 2016 (JP) ................. 2016-026629

(51) Int. Cl.

| B41J 2/045 | (2006.01) |
|---|---|
| B41J 2/21 | (2006.01) |
| B41J 2/205 | (2006.01) |
| G06K 15/02 | (2006.01) |
| H04N 1/00 | (2006.01) |

(52) U.S. Cl.
CPC ......... *B41J 2/2132* (2013.01); *B41J 2/04536* (2013.01); *B41J 2/04553* (2013.01); *B41J 2/04563* (2013.01); *B41J 2/04581* (2013.01); *B41J 2/205* (2013.01); *G06K 15/02* (2013.01); *H04N 1/00* (2013.01); *B41J 2202/21* (2013.01)

(58) Field of Classification Search
CPC ...... G06K 15/02; H04N 1/00; H04N 1/00005; B41J 2202/21; B41J 2/2132; B41J 2/205; B41J 2/04581; B41J 2/04553; B41J 2/04563; B41J 2/04536; B41J 2/36; B41J 2/362; B41J 2/365

See application file for complete search history.

(56) References Cited

U.S. PATENT DOCUMENTS

| 8,919,907 | B1 | 12/2014 | Shimomura | |
|---|---|---|---|---|
| 9,056,486 | B1 | 6/2015 | Bansyo | |
| 2004/0100517 | A1* | 5/2004 | Shioya | B41J 2/2132 347/15 |
| 2008/0226310 | A1* | 9/2008 | Togami | G03G 15/553 399/27 |
| 2009/0244153 | A1* | 10/2009 | Miyamoto | B41J 2/2139 347/15 |
| 2009/0244154 | A1* | 10/2009 | Miyamoto | B41J 2/2139 347/15 |

(Continued)

FOREIGN PATENT DOCUMENTS

JP        2013-86412 A    5/2013

*Primary Examiner* — Julian D Huffman
(74) *Attorney, Agent, or Firm* — Greenblum & Bernstein, P.L.C.

(57) ABSTRACT

A controller of an inkjet printer: calculates second density correction values for respective nozzles arranged in a predetermined direction to print a second line of an image data, by using gray-level values of pixels in the second line of the image data corresponding to the respective nozzles and first density correction values for the respective nozzles to print a first line of the image data printed immediately prior to the second line; and corrects the gray-level values of the pixels in the second line of the image data corresponding to the respective nozzles, by using the calculated second density correction values.

8 Claims, 6 Drawing Sheets

(56) References Cited

U.S. PATENT DOCUMENTS

| | | | |
|---|---|---|---|
| 2012/0182341 A1* | 7/2012 | Miura | B41J 2/2132 347/12 |
| 2012/0242732 A1* | 9/2012 | Nagahara | B41J 2/2132 347/14 |
| 2015/0158289 A1* | 6/2015 | Marumoto | B41J 2/2132 347/15 |
| 2016/0052300 A1* | 2/2016 | Ueshima | B41J 2/205 347/16 |
| 2016/0236466 A1* | 8/2016 | Takahashi | B41J 2/04515 |
| 2017/0118381 A1 | 4/2017 | Shimomura | |

* cited by examiner

INKJET PRINTER WITH DENSITY CORRECTION FUNCTION

CROSS REFERENCE TO RELATED APPLICATION

This application is based upon and claims the benefit of priority from the prior Japanese Patent Application No. 2016-026629, filed on Feb. 16, 2016, the entire contents of which are incorporated herein by reference.

BACKGROUND

1. Technical Field

The disclosure relates to an inkjet printer which performs printing by ejecting an ink from an inkjet head.

2. Related Art

In an inkjet printer, there occurs a phenomenon in which an ink ejection amount of each of nozzles in an inkjet head varies depending on the latest ink ejection frequencies. This phenomenon sometimes decreases print quality due to the generation of an unintentional density difference between adjacent areas in a print image and an unintentional density variation in the print image.

Japanese Patent Application Publication No. 2013-86412 proposes a technique of suppressing the decrease in print quality caused by the density variation in the inkjet printer. In this technique, a density variation amount indicating an estimated color material density of an ink in each nozzle is calculated based on image data, and density correction of the image data is performed based on the density variation amount. Hence, it is possible to perform appropriate density correction and suppress the decrease in print quality, in a situation where the color material density in the nozzle varies with the ink ejection frequency.

SUMMARY

In the technique described above, measures are taken against the variation in color material density of the ink in each nozzle. However, no consideration is made for variation in ink ejection amount of the nozzle depending on the ink ejection frequency described above, and this variation may cause the decrease of print quality.

An object of the disclosure is to provide an inkjet printer which can suppress a decrease in print quality.

An inkjet printer in accordance with some embodiments includes: an inkjet head including nozzles arranged in a predetermined direction, the inkjet head configured to eject ink from the nozzles; and a controller configured to drive the inkjet head based on an image data to eject the ink from the respective nozzles onto a print medium and perform printing. The controller is configured to calculate second density correction values for the respective nozzles to print a second line of the image data, by using gray-level values of pixels in the second line of the image data corresponding to the respective nozzles and first density correction values for the respective nozzles to print a first line of the image data printed immediately prior to the second line, and correct the gray-level values of the pixels in the second line of the image data corresponding to the respective nozzles, by using the calculated second density correction values.

In the configuration described above, since the inkjet printer suppresses the density variation in a print image caused by a phenomenon in which ink ejection amounts of the respective nozzles vary depending on the ink ejection frequencies of the nozzles, a decrease in print quality can be suppressed.

The controller may be configured to adjust the second density correction value for a first nozzle of the nozzles, by using the second density correction value for at least one second nozzle of the nozzles adjacent to the first nozzle.

In the configuration described above, a decrease in accuracy of density correction can be suppressed when relationships between the nozzles and the pixels in the image data are changed according to the position of the print medium in a nozzle arrangement direction.

The inkjet printer may further include a temperature detector configured to detect at least one temperature of an ink temperature, an environmental temperature around the inkjet head, or a temperature of the inkjet head. The controller may be configured to adjust the second density correction values according to the at least one temperature detected by the temperature detector.

In the configuration described above, the accuracy of density correction can be improved by adjusting the density correction values according to the temperature detected by the temperature detector which detects the ink temperature and the like relating to the ink ejection amounts.

The controller may be configured to calculate third density correction values for the respective nozzles to print a third line of the image data, by using gray-level values of pixels in the third line of the image data corresponding to the respective nozzles and the second density correction values for the respective nozzles to print the second line of the image data printed immediately prior to the third line, and correct the gray-level values of the pixels in the third line of the image data corresponding to the respective nozzles, by using the calculated third density correction values.

DETAILED DESCRIPTION

Figure 1:
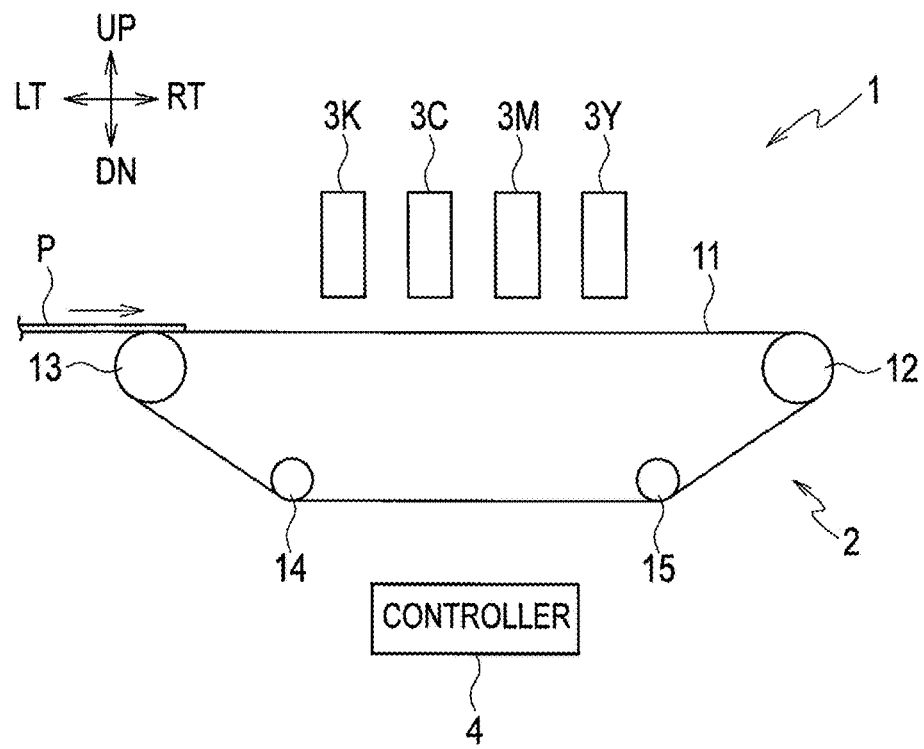
FIG. 1 is a schematic configuration diagram of an inkjet printer according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from the actual ones.

Figure 2:
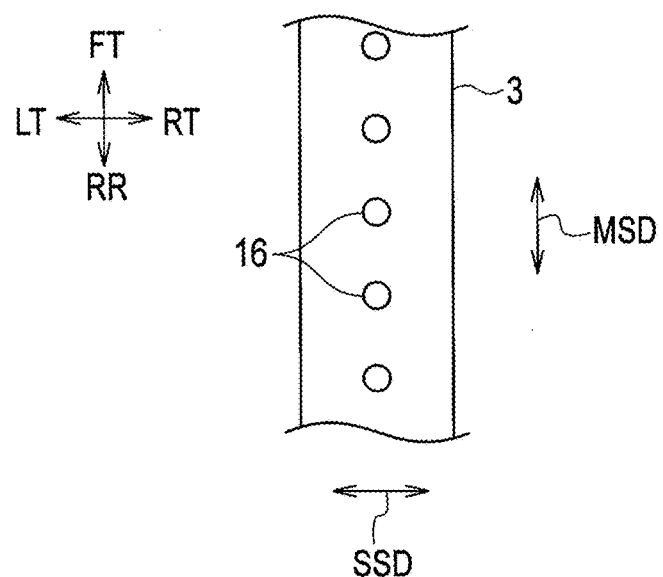
FIG. 2 is a schematic configuration diagram of an inkjet head in the inkjet printer illustrated in FIG. 1.
Figure 3:
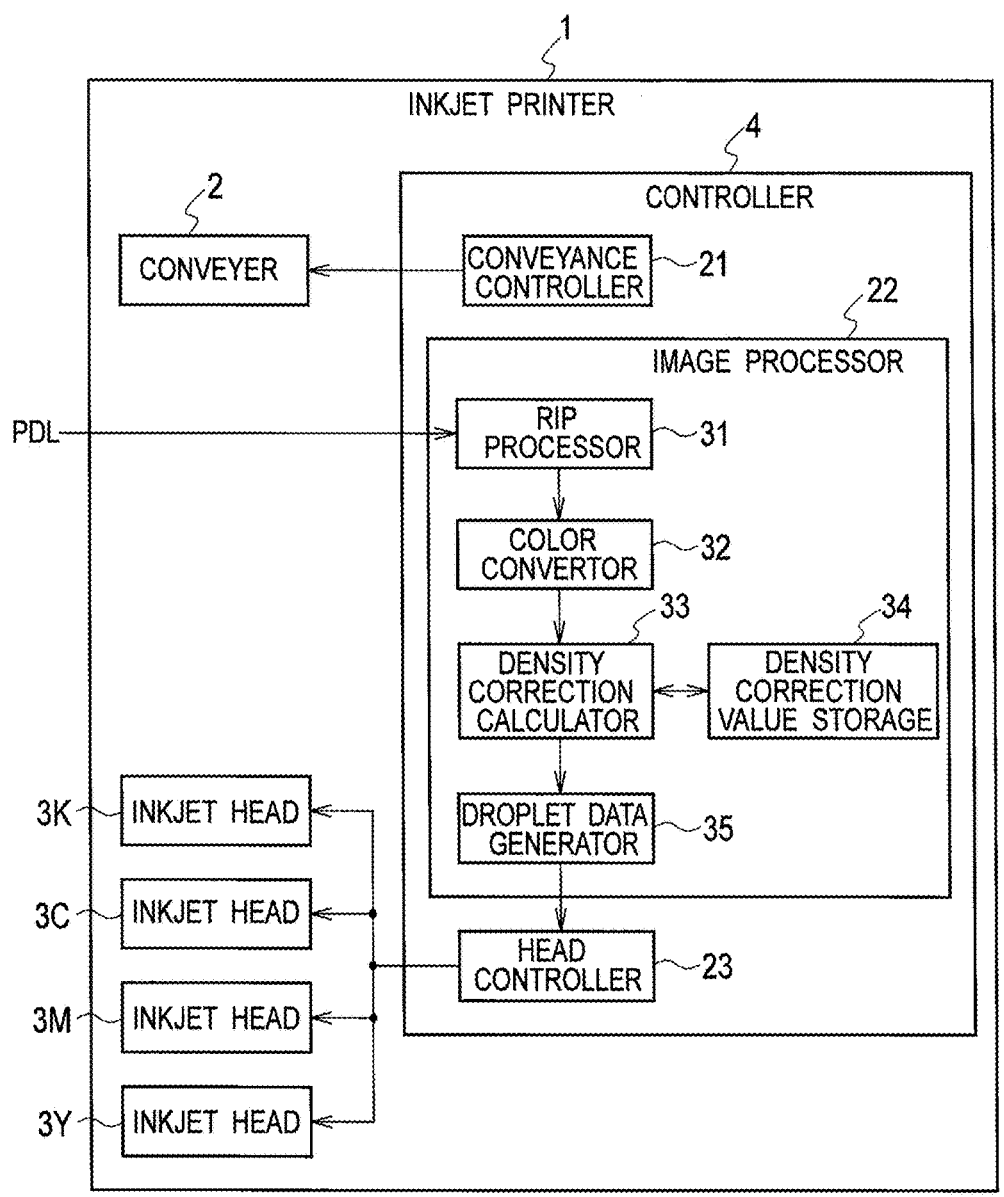
FIG. 3 is a control block diagram of the inkjet printer illustrated in FIG. 1.

FIG. 1 is a schematic configuration diagram of an inkjet printer 1 according to an embodiment of the present invention. FIG. 2 is a schematic configuration diagram of an inkjet head of the inkjet printer 1. FIG. 3 is a control block diagram of the inkjet printer 1. In the following description, the direction orthogonal to the sheet surface of FIG. 1 is referred to as a front-rear direction unless otherwise noted. Moreover, in FIGS. 1, 2, 5, 8, and 9, the rightward direction, the leftward direction, the upward direction, the downward direction, the forward direction, the rearward direction, the main scanning direction, the sub-scanning direction, and the print direction are denoted by RT, LT, UP, DN, FT, RR, MSD, SSD, and PD, respectively.

As illustrated in FIGS. 1 and 3, the inkjet printer 1 includes a conveyer 2, inkjet heads 3K, 3C, 3M, and 3Y, and a controller 4. Note that the inkjet heads 3K, 3C, 3M, and 3Y are sometimes generally referred to by omitting the attached alphabets (K, C, M, and Y).

The conveyer 2 conveys a sheet P which is a print medium fed from a not-illustrated paper feeder. A direction from left to right in FIG. 1 is a conveyance direction of the sheet P. The conveyer 2 includes a conveyer belt 11, a drive roller 12, and driven rollers 13, 14 and 15.

The conveyer belt 11 conveys the sheet P while sucking and holding the sheet P. The conveyer belt 11 is an annular belt wound around the drive roller 12 and the driven rollers 13 to 15. Many belt holes for sucking and holding the sheet P are formed in the conveyer belt 11. The conveyer belt 11 sucks and holds the sheet P on an upper surface thereof by using sucking force generated at the belt holes by drive of a fan (not illustrated). The conveyer belt 11 is rotated clockwise in FIG. 2 to convey the sucked and held sheet P in a direction from left to right in FIG. 1.

The drive roller 12 rotates the conveyer belt 11. The drive roller 12 is driven by a not-illustrated motor.

The driven rollers 13 to 15 support the conveyer belt 11 together with the drive roller 12. The driven rollers 13 to 15 are driven by the drive roller 12 via the conveyer belt 11. The driven roller 13 is arranged on the left side of the drive roller 12 at the same height as the drive roller 12. The driven rollers 14 and 15 are arranged below the drive roller 12 and the driven roller 13, at substantially the same height while being spaced away from each other in a left-right direction.

The inkjet heads 3K, 3C, 3M, and 3Y eject inks to the sheet P conveyed by the conveyer 2 to print an image. The inkjet heads 3K, 3C, 3M and 3Y eject a black (K) ink, a cyan (C) ink, a magenta (M) ink, and a yellow (Y) ink, respectively. The inkjet heads 3K, 3C, 3M, and 3Y are arranged above the conveyer 2 in parallel to each other at intervals in the left-right direction (sub-scanning direction).

As illustrated in FIG. 2, each of the inkjet heads 3 has multiple nozzles 16. The nozzles 16 eject the ink. The nozzles 16 are opened on a lower surface of the inkjet head 3. The multiple nozzles 16 are arranged at equal intervals in a front-rear direction (main scanning direction). The inkjet head 3 prints an image by ejecting the ink from the nozzles 16 for each line extending in the main scanning direction.

The inkjet heads 3 are multi-drop inkjet heads which can eject multiple ink droplets for one pixel from one nozzle 16, and performs gradation printing in which density is expressed by the number of ink droplets (droplet number).

The inkjet heads 3 are shear-mode inkjet heads. Each of the inkjet heads 3 has an ink chamber (not illustrated) for storing the ink supplied from an ink cartridge (not illustrated). Multiple pressure chambers (not illustrated) communicating with the respective nozzles 16 are provided in the ink chamber. In each of the pressure chambers, partition walls with the adjacent pressure chambers are formed by two piezoelectric members (not illustrated) with opposite directions of polarization. Electrodes (not illustrated) are formed in tight contact with the partition walls with the adjacent pressure chambers. When drive voltage is applied to the electrodes, the partition walls are shear-deformed and the volume of the pressure chamber and the pressure inside the pressure chamber change. This causes the ink in the pressure chamber to be ejected from the nozzle 16. The operation of the partition walls is controlled by adjusting the magnitude of the drive voltage applied to the electrodes of the inkjet head 3 and the waveform of the drive voltage (drive waveform), and the ejection speed and the like of the ink can be thereby controlled.

The controller 4 controls the operation of the entire inkjet printer 1. The controller 4 includes a conveyance controller 21, an image processor 22, and a head controller 23. These units of the controller 4 can be implemented by hardware or software by using a CPU, a RAM, a ROM, a hard disk, a storage formed of a semiconductor memory, and the like. The storage stores instructions that, when executed by a processor of the CPU, cause the processor to perform operations explained below.

The conveyance controller 21 drives the conveyer 2 and causes the conveyer 2 to convey the sheet P.

The image processor 22 processes a page description language (PDL) file received from an external personal computer or the like to generate droplet data of each of the colors corresponding to the inkjet heads 3K, 3C, 3M, and 3Y. The droplet data of each color is data indicating the droplet number of the ink at each pixel for the each color.

The image processor 22 includes a raster image processor (RIP) 31, a color convertor 32, a density correction calculator 33, a density correction value storage 34, and a droplet data generator 35.

The RIP 31 rasterizes the PDL file and generates RGB image data. The RGB image data is 8-bit 256-level data for each color.

The color convertor 32 converts the RGB image data generated by the RIP 31 into 8-bit CMYK image data for each color. This color conversion can be performed by using a table in which relationships between RGB values and CMYK values are recorded in advance.

The density correction calculator 33 performs density correction processing on image data of each color in the CMYK image data generated by the color convertor 32, according to ink ejection histories of the respective nozzles 16 based on the image data.

The density correction value storage 34 stores density correction values used in the density correction processing by the density correction calculator 33. The density correction value storage 34 stores the density correction values for the respective nozzles 16 in the inkjet heads 3K, 3C, 3M, and 3Y. The density correction values are updated for each line of the print image which extends in the main scanning direction.

The droplet data generator 35 generates pieces of droplet data of the respective colors of C, M, Y, and K based on the pieces of image data of the respective colors corrected by the density correction calculator 33. The processing of generating the droplet data by the droplet data generator 35 can be achieved by applying error diffusion processing or dither mask processing to the pieces of image data of the respective colors.

The head controller 23 drives the inkjet heads 3K, 3C, 3M, and 3Y based on the pieces of droplet data of the respective colors generated by the droplet data generator 35 and causes the inkjet heads 3K, 3C, 3M, and 3Y to eject the inks from the nozzles 16.

Next, operations of the inkjet printer 1 are described.

When the PDL file is inputted from the external personal computer or the like, the RIP 31 of the image processor 22 rasterizes the PDL file and generates the RGB image data.

Next, the color convertor 32 converts the RGB image data generated by the RIP 31 into the CMYK image data.

Then, the density correction calculator 33 performs the density correction processing on the image data of each color in the CMYK image data generated by the color convertor 32, according to the ejection histories of the respective nozzles 16.

Specifically, the density correction calculator 33 calculates the density correction values corresponding to the ink ejection histories of the respective nozzles 16 in each inkjet head 3, based on the image data of the corresponding color, and corrects the density of the pixels being ejection targets of the respective nozzles 16 by using the calculated density correction values. To be more specific, the density correction calculator 33 calculates the density correction values for the respective nozzles 16 to print each line of the image data by using pixel values of the pixels in the each line to be printed by the respective nozzles 16 and the density correction values for the nozzles 16 to print the line printed immediately before the each line. Then, the density correction calculator 33 corrects the pixel values of the pixels to be printed by the respective nozzles 16 by using the calculated density correction values.

The density correction processing in the density correction calculator 33 is described with reference to the flowchart of FIG. 4. The density correction processing is performed to suppress density variation in the print image caused by a phenomenon in which the ink ejection amounts of the respective nozzles 16 vary depending on the ink ejection frequencies of the nozzles 16. The processing of the flowchart in FIG. 4 is performed on the image data of each of the colors of CMYK.

Figure 4:
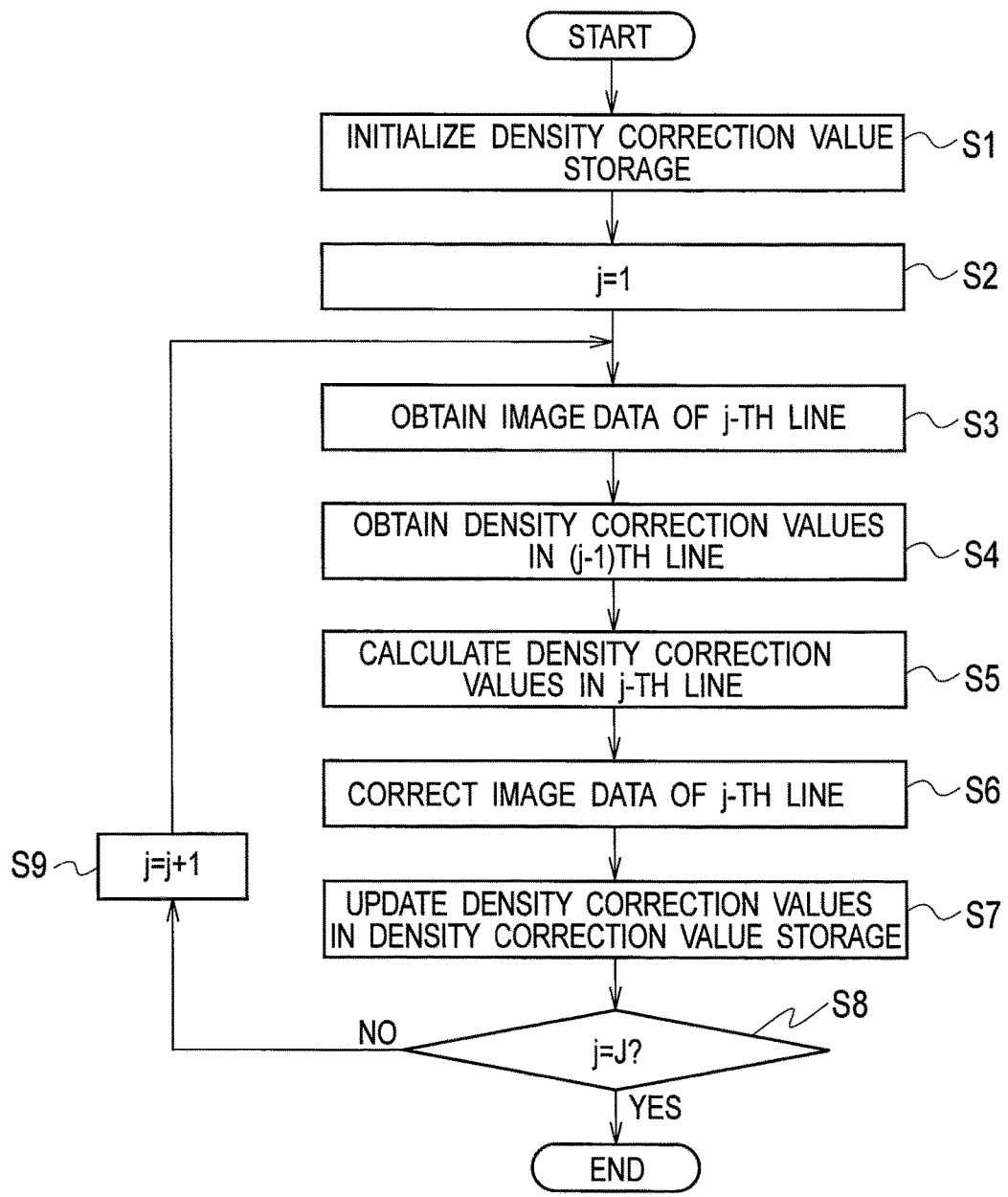
FIG. 4 is a flowchart of density correction processing.

In step S1 of FIG. 4, the density correction calculator 33 initializes the density correction value storage 34. The density correction values for the respective nozzles 16 in the inkjet head 3 ejecting an ink of a processing target color are thereby set to zero.

Next, in step S2, the density correction calculator 33 sets a variable j indicating a line number in the image data to "1." The line number indicates the order of the line in the sub-scanning direction, the line extending in the main scanning direction in the image data.

Then, in step S3, the density correction calculator 33 obtains image data of the j-th line in the image data of the processing target color. The image data of the j-th line indicates the pixel values (gray-level values) of the respective pixels in the j-th line.

Next, in step S4, the density correction calculator 33 obtains the density correction values for the respective nozzles 16 in the (j−1)th line which are stored in the density correction value storage 34. When j=1, the density correction values for the respective nozzles 16 in the (j−1)th line are 0 which is the density correction value in the initialized density correction value storage 34.

Then, in step S5, the density correction calculator 33 calculates the density correction values for the respective nozzles 16 in the j-th line by using the image data of the j-th line and the density correction values in the (j−1)th line.

Specifically, the density correction calculator 33 calculates the density correction values for the respective nozzles 16 in the j-th line by using the following formula (1).

$$h[i][j] = h[i][j-1] \times \text{decay} + p[i][j] \times \text{gain} \quad (1).$$

In this formula, h[i][j] is the density correction value of the i-th pixel in the j-th line, h[i][j−1] is the density correction value of the i-th pixel in the (j−1)th line, and p[i][j] is the pixel value (gray-level value) of the i-th pixel in the j-th line.

The pixel number i corresponds to an index number of each nozzle 16 in the inkjet head 3. Specifically, p[i][j] is the pixel value corresponding to the nozzle 16 with the i-th index number in the printing of the j-th line, and h[i][j] is the density correction value for this nozzle 16. h[i][j−1] is the density correction value for the i-th nozzle 16 in the printing of the (j−1)th line. The index number of the nozzle 16 indicates the order of the nozzle 16 from one side of the inkjet head 3 in the main scanning direction (front-rear direction).

The "decay" in the formula (1) is a decay constant. The decay constant decay is a constant determined according to the rate of variation of the ink ejection amount depending on the ink ejection frequency of the nozzle 16. The slower the rate of variation of the ink ejection amount depending on the ink ejection frequency is, the greater the decay constant decay is.

The "gain" in the formula (1) is a gain constant. The gain constant gain is a constant determined according to the degree of variation of the ink ejection amount depending on the ink ejection frequency of the nozzle 16. The greater the degree of variation of the ink ejection amount depending on the ink ejection frequency is, the greater the gain constant gain is.

The phenomenon in which the ink ejection amounts of the nozzles 16 vary depending on the ink ejection frequencies of the nozzles 16 is caused by change in the viscosity of the ink due to accumulation of heat generated by the ink ejection or by change in a piezoelectric constant of the piezoelectric members forming the partition walls of the pressure chambers in the inkjet head 3. The higher the ink ejection frequency is, the greater the ink ejection amount is. The decay constant decay and the gain constant gain are changed depending on the characteristics of the ink and the inkjet head 3, drive conditions (drive frequency, drive waveform, drive voltage, and the like) of the inkjet head 3, and the like which are factors affecting this phenomenon. The values of the decay constant decay and the gain constant gain for each of the inkjet heads 3K, 3C, 3M, and 3Y are determined in advance for each drive condition based on experiments.

The density correction calculator 33 calculates the density correction value h[i][j] by using the formula (1) as well as the decay constant decay and the gain constant gain corresponding to the set drive condition.

Then, in step S6, the density correction calculator 33 corrects the image data of the j-th line by using the density correction values of the respective pixels calculated in step S5. Specifically, the density correction calculator 33 calculates the corrected pixel values of the respective pixels in the j-th line by using the following formula (2).

$$p'[i][j] = p[i][j] - h[i][j] \quad (2).$$

In this formula, p'[i][j] is the corrected pixel value (gray-level value) of the i-th pixel in the j-th line.

In the printing, ink droplets as many as the droplet number corresponding to the corrected pixel value in each pixel are ejected from the corresponding nozzle 16. Moreover, as can be seen in the formula (2), the corrected pixel values are based on the pixel values before the correction. Hence, it can be said that the numbers of ink droplets ejected from the respective nozzles 16 in each line are based on the pixel values before the correction.

As can be seen in the formula (1), the density correction values in each line are based on the pixel values before the correction in the each line and on the density correction values in the line printed immediately before the each line. Accordingly, the density correction values in each line are based on the pixel values before the correction in the lines up to the line immediately before the each line.

Hence, it can be said that the density correction values for the respective nozzles 16 in each line are based on the numbers of ink droplets ejected in the lines up to the line immediately before the each line. In other words, the density correction values for the respective nozzles 16 in each line are based on the ink ejection histories of the respective nozzles 16 up to this moment.

After correcting the image data of the j-th line, the density correction calculator 33 outputs the corrected image data of the j-th line to the droplet data generator 35.

Next, in step S7, the density correction calculator 33 updates the density correction values in the (j−1)th line stored in the density correction value storage 34 to the density correction values in the j-th line calculated in step S5.

In step S8 subsequent to step S7, the density correction calculator 33 determines whether the variable j is "J" indicating the final line in the image data of the processing target color.

When the density correction calculator 33 determines that j is not J (step S8: NO), the density correction calculator 33 adds "1" to the variable j in step S9. Thereafter, the density correction calculator 33 returns to step S3.

When the density correction calculator 33 determines that j is J in step S8 (step S8: YES), the density correction processing is terminated.

The droplet data generator 35 converts the pieces of image data of the respective colors corrected by the density correction calculator 33 into pieces of droplet data.

The head controller 23 drives the inkjet heads 3K, 3C, 3M, and 3Y based on the pieces of droplet data of the respective colors generated by the droplet data generator 35 and causes the inkjet heads 3K, 3C, 3M, and 3Y to eject the inks from the nozzles 16 onto the sheet P conveyed by the conveyer 2. An image is thereby printed on the sheet P.

As described above, in the inkjet printer 1, the density correction calculator 33 calculates the density correction values corresponding to the ink ejection histories of the respective nozzles 16 in the inkjet heads 3, based on the pieces of image data of the colors of CMYK. Specifically, the density correction calculator 33 calculates the density correction values for the respective nozzles 16 to print each line of the image data, by using the pixel values of the pixels in the each line to be printed by the respective nozzles 16 and the density correction values for the nozzles 16 to print the line printed immediately before the each line. Then, the density correction calculator 33 corrects the pixel values (gray-level values) of the pixels to be printed by the respective nozzles 16 by using the calculated density correction values. This suppresses density variation in the print image caused by the phenomenon in which the ink ejection amounts of the respective nozzles 16 vary depending on the ink ejection frequencies of the nozzles 16, and the decrease of print quality can be thereby suppressed.

Figure 5:
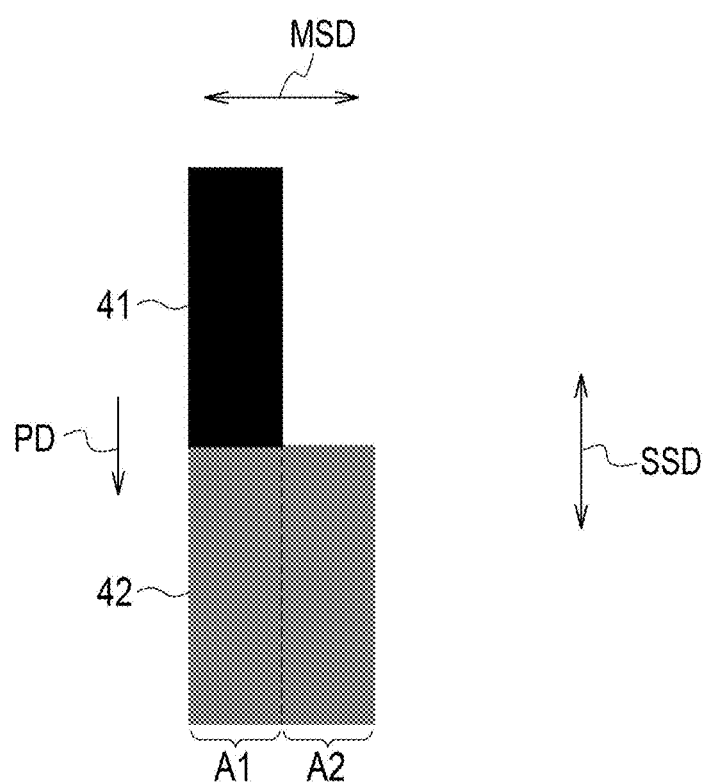
FIG. 5 is a view illustrating an example of a chart in which a density difference may occur due to variation in ink ejection amount of each nozzle depending on ink ejection frequency of the nozzle.

FIG. 5 illustrates an example of a chart in which a density difference may occur due to variation in the ink ejection amounts of the respective nozzles 16 depending on the ink ejection frequencies of the nozzles 16. The horizontal direction in FIG. 5 is the main scanning direction and the vertical direction in FIG. 5 is the sub-scanning direction. A direction from the top to the bottom of FIG. 5 in the vertical direction is the direction in which the chart is printed.

The chart of FIG. 5 includes a first solid image 41 and a second solid image 42. The first solid image 41 and the second solid image 42 are each a solid image with uniform density. The density of the second solid image 42 is lower than that of the first solid image 41.

The second solid image 42 is printed after the first solid image 41. The second solid image 42 is divided into a first area A1 and a second area A2. The first area A1 is an area printed by the nozzles 16 having printed the first solid image 41, and the second area A2 is an area other than the first area A1. In other words, the ink ejection frequency of each nozzle 16 at the time of printing the second solid image 42 in the first area A1 is higher than that in the second area A2.

Figure 6:
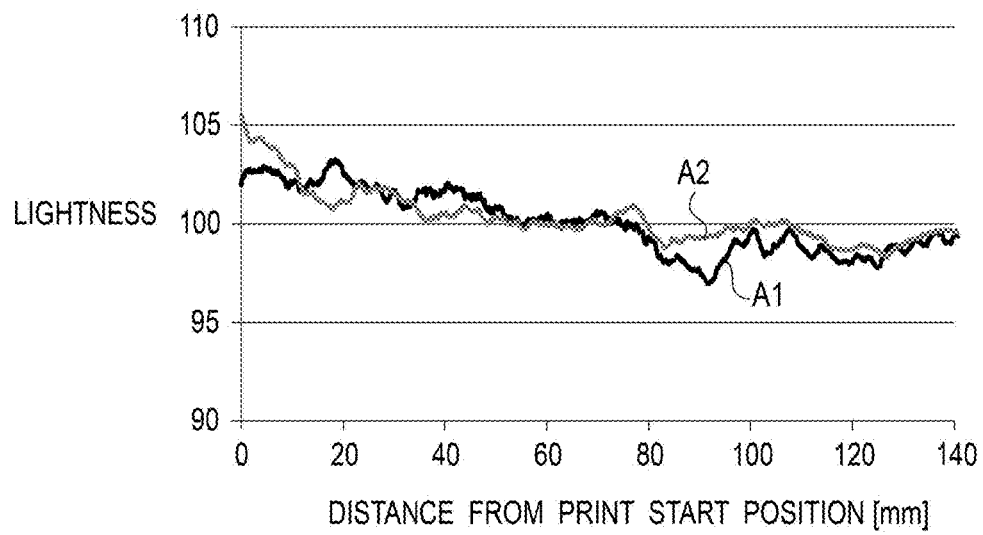
FIG. 6 is a graph illustrating measurement results of the density (lightness) in a first area and a second area of a second solid image in the chart of FIG. 5 printed by the inkjet printer illustrated in FIG. 1.
Figure 7:
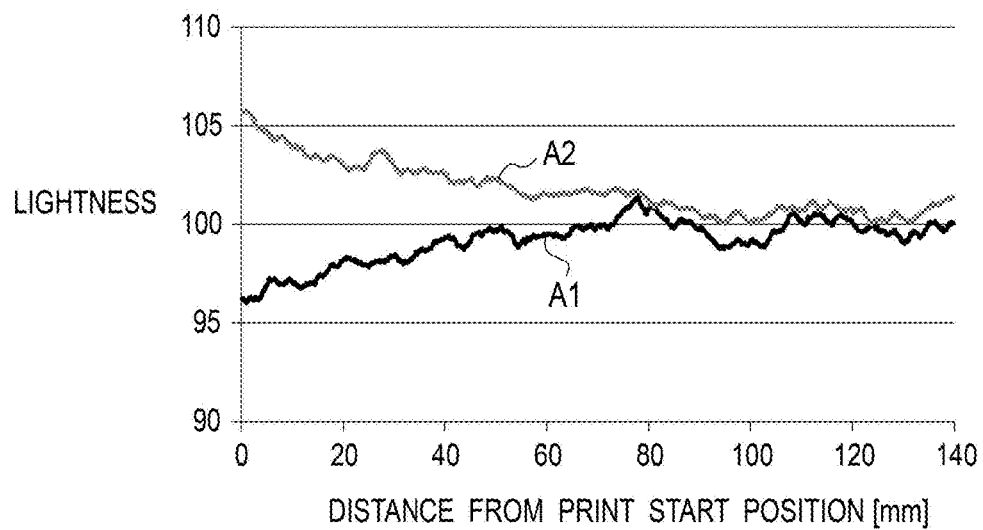
FIG. 7 is a graph illustrating measurement results of the density (lightness) in the first area and the second area of the second solid image in the chart of FIG. 5 printed in a comparative example.

FIG. 6 illustrates measurement results of density (lightness) in the first area A1 and the second area A2 of the second solid image 42 in the case where the chart of FIG. 5 is subjected to the density correction processing performed by the density correction calculator 33 and is printed by the inkjet printer 1 of the embodiment. As a comparative example, FIG. 7 illustrates measurement results of density in the first area A1 and the second area A2 of the second solid image 42 in the case where the chart of FIG. 5 is printed without being subjected to the density correction processing of the embodiment. In FIGS. 6 and 7, the vertical axis represents the lightness. The smaller the value of the lightness is, the higher the density is. The horizontal axis of FIGS. 6 and 7 represents the distance from a print start position of the second solid image 42 in the print direction (sub-scanning direction).

As illustrated in FIG. 7, when no density correction processing of the embodiment is performed, the density in the first area A1 in which the ink ejection frequency is higher due to printing of the first solid image 41 is higher than the density in the second area A2, and there is a density difference between the first area A1 and the second area A2. Meanwhile, when the density correction processing of the embodiment is performed, as illustrated in FIG. 6, the density difference between the first area A1 and the second area A2 is reduced from that in the example of FIG. 7.

Modified Example 1

Figure 8:
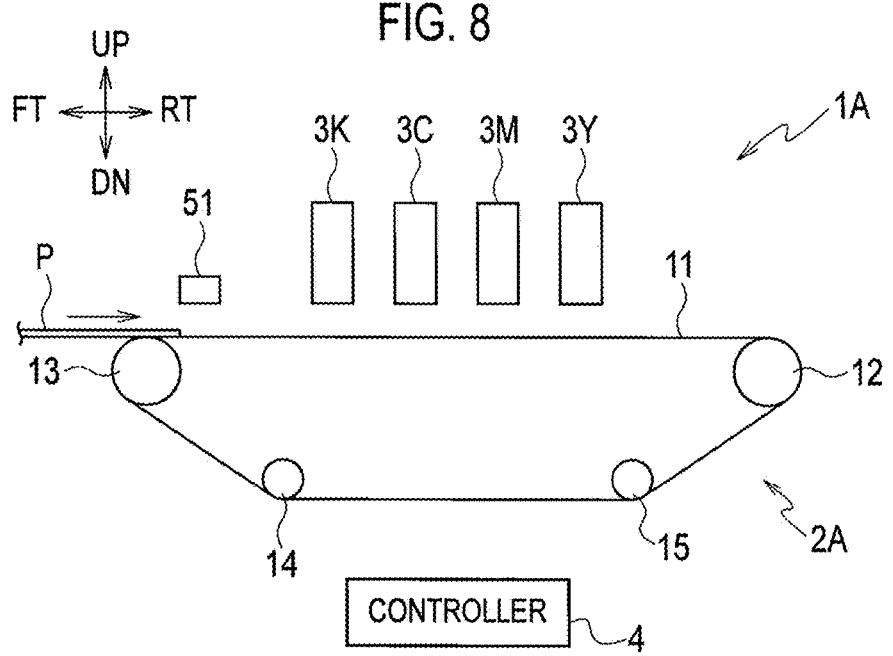
FIG. 8 is a schematic configuration diagram of an inkjet printer in Modified Example 1.

FIG. 8 is a schematic configuration diagram of an inkjet printer 1A in Modified Example 1 of the aforementioned embodiment.

As illustrated in FIG. 8, the inkjet printer 1A in Modified Example 1 has a configuration in which the conveyer 2 of the inkjet printer 1 in the aforementioned embodiment is replaced by a conveyer 2A.

The conveyer 2A has a configuration in which a contact image sensor (CIS) 51 is added to the aforementioned conveyer 2 of the inkjet printer 1.

The CIS 51 detects the position of the sheet P in the main scanning direction (front-rear direction). The CIS 51 is arranged upstream of the inkjet head 3K in the sheet conveyance direction, the inkjet head 3K being arranged upstream of all the other inkjet heads in the inkjet heads 3K, 3C, 3M, and 3Y in the sheet conveyance direction. The CIS 51 is formed of a line sensor extending in the front-rear direction.

In Modified Example 1, the head controller 23 of the controller 4 controls the inkjet head 3 according to the position of the sheet P in the main scanning direction detected by the CIS 51 such that the printing is performed while the relationships between the nozzles 16 and the pixels in the image data are changed in real time.

The density correction calculator 33 of the image processor 22 adjusts the density correction value for each nozzle 16 by using the density correction value for at least one nozzle 16 adjacent to the each nozzle 16. Specifically, the density correction calculator 33 smoothes the density correction value for each nozzle 16 with the density correction value for at least one nozzle 16 adjacent to the each nozzle 16.

For example, the density correction calculator 33 calculates an average value of the density correction values for each nozzle 16 calculated based on the image data and for a predetermined number of nozzles 16 adjacent to the each nozzle 16 on both sides thereof in the main scanning direction. Then, the density correction calculator 33 corrects the pixel value of the ejection target pixel of the each nozzle 16 by using the calculated average value as the density correction value for the each nozzle 16.

As another method of smoothing, the density correction calculator 33 performs convolution with a separately-prepared filter function, on an array in which the density correction values for the respective nozzles 16 calculated based on the image data are arranged in the order of the nozzles. Then, the density correction calculator 33 corrects the pixel values of the ejection target pixels of the respective nozzles 16 by using, as the density correction values, the array to which the convolution is applied.

As described above, in Modified Example 1, the density correction value for each nozzle 16 is adjusted by using the density correction value for at least one nozzle 16 adjacent to the each nozzle 16. Accordingly, a decrease in the accuracy of density correction can be suppressed when the relationships between the nozzles 16 and the pixels in the image data are changed according to the position of the sheet P in the main scanning direction.

Modified Example 2

Figure 9:
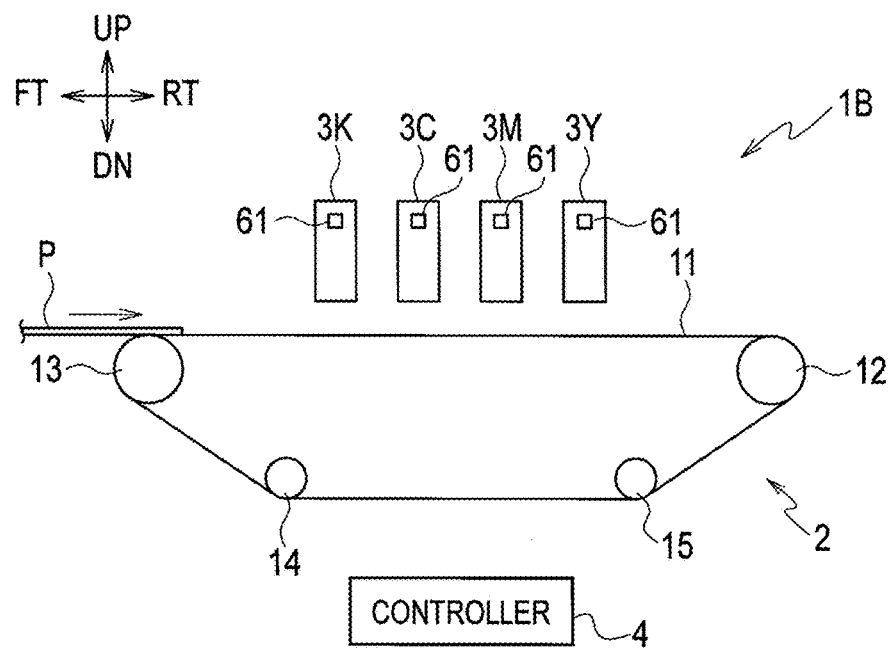
FIG. 9 is a schematic configuration diagram of an inkjet printer in Modified Example 2.

FIG. 9 is a schematic configuration diagram of an inkjet printer 1B in Modified Example 2 of the aforementioned embodiment.

As illustrated in FIG. 9, the inkjet printer 1B in Modified Example 2 has a configuration in which temperature sensors (temperature detectors) 61 are installed respectively in the inkjet heads 3K, 3C, 3M, and 3Y of the inkjet printer 1 in the aforementioned embodiment.

The temperature sensors 61 detect the temperatures of the inkjet heads 3K, 3C, 3M, and 3Y, respectively.

In Modified Example 2, the density correction calculator 33 of the image processor 22 adjusts the density correction values for the respective nozzles 16 in each of the inkjet heads 3K, 3C, 3M, and 3Y, according to the temperature detected by the corresponding temperature sensor 61 at the start of printing. Specifically, the density correction calculator 33 adjusts the decay constant decay and the gain constant gain according to the temperature detected by the temperature sensor 61 at the start of printing.

The viscosity of the ink and the piezoelectric constant of the piezoelectric members forming the partition walls of the pressure chambers in each inkjet head 3 change depending on the temperature of the inkjet head 3, and the ink ejection amounts from the respective nozzles 16 thereby change. The density correction calculator 33 thus adjusts the decay constant decay and the gain constant gain according to the temperature detected by the temperature sensor 61 to perform density correction according to the temperature of the inkjet head 3. The decay constant decay and the gain constant gain according to the temperature of the inkjet head 3 are determined in advance based on experiments.

As described above, in Modified Example 2, the density correction calculator 33 can improve the accuracy of the density correction by detecting the temperature of each inkjet head 3 relating to the ink ejection amounts with the temperature sensor 61 and by adjusting the density correction values according to the detected temperature.

Note that, since the viscosity of the ink changes depending on the temperature of the ink and the ink ejection amount changes depending on the viscosity of the ink, the inkjet printer 1B may detect the temperature of the ink at the start of printing with a temperature sensor and adjust the density correction values according to the detected temperature. Moreover, since the temperature of the ink and the temperature of the inkjet head 3 change depending on the environmental temperature around the inkjet head 3, the inkjet printer 1B may detect the environmental temperature around the inkjet head 3 at the start of printing with a temperature sensor and adjust the density correction values according to the detected temperature. The inkjet printer 1B may adjust the density correction values by detecting the temperature of the inkjet head 3, the temperature of the ink, and the environmental temperature around the inkjet head 3 and combining two or more of the detected temperatures.

The adjustment of density correction values similar to that in Modified Example 2 may also be performed in Modified Example 1.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An inkjet printer, comprising:
   an inkjet head including nozzles arranged in a predetermined direction, the nozzles configured to eject ink and print at least first and second lines of data; and
   a controller configured to drive the inkjet head based on an image data to eject the ink from the respective nozzles onto a print medium for each line extending in the predetermined direction and perform printing, wherein the controller is configured to:
  calculate first density correction values;
  calculate second density correction values for the respective nozzles to print a second line of the image data, by using gray-level values of pixels in the second line of the image data corresponding to the respective nozzles and by using the first density correction values for the respective nozzles to print a first line of the image data printed immediately prior to the second line, the first density correction values being used for correcting gray-level values of the pixels in the first line of the image data corresponding to the respective nozzles,
  correct the gray-level values of the pixels in the second line of the image data corresponding to the respective nozzles, by using the calculated second density correction values; and
  drive the inkjet head based on the image data with the corrected gray-level values of the pixels to eject the ink from the respective nozzles onto the print medium.

2. The inkjet printer according to claim 1,
wherein the controller is configured to adjust the second density correction value for a first nozzle of the nozzles, by using the second density correction value for at least one second nozzle of the nozzles adjacent to the first nozzle.

3. The inkjet printer according to claim 1, wherein the controller is configured to
  calculate third density correction values for the respective nozzles to print a third line of the image data, by using gray-level values of pixels in the third line of the image data corresponding to the respective nozzles and the second density correction values for the respective nozzles to print the second line of the image data printed immediately prior to the third line, and
  correct the gray-level values of the pixels in the third line of the image data corresponding to the respective nozzles, by using the calculated third density correction values.

4. The inkjet printer according to claim 1,
wherein the controller is configured to correct the gray-level values of the pixels in the first line of the image data corresponding to the respective nozzles, by using the calculated first density correction values.

5. An inkjet printer, comprising:
an inkjet head including nozzles arranged in a predetermined direction, the nozzles configured to eject ink and print at least first and second lines of data; and
a controller configured to drive the inkjet head based on an image data to eject the ink from the respective nozzles onto a print medium for each line extending in the predetermined direction and perform printing; and
a temperature detector configured to detect at least one temperature of an ink temperature, an environmental temperature around the inkjet head, or a temperature of the inkjet head,
wherein the controller is configured to:
  calculate first density correction values;
  calculate second density correction values for the respective nozzles to print a second line of the image data, by using gray-level values of pixels in the second line of the image data corresponding to the respective nozzles and by using the first density correction values for the respective nozzles to print a first line of the image data printed immediately prior to the second line, the first density correction values being used for correcting gray-level values of the pixels in the first line of the image data corresponding to the respective nozzles,
  correct the gray-level values of the pixels in the second line of the image data corresponding to the respective nozzles, by using the calculated second density correction values;
  drive the inkjet head based on the image data with the corrected gray-level values of the pixels to eject the ink from the respective nozzles onto the print medium; and
  adjust the second density correction values according to the at least one temperature detected by the temperature detector.

6. An inkjet printer, comprising:
an inkjet head including nozzles arranged in a predetermined direction, the nozzles configured to eject ink and print at least first and second lines of data; and
a controller configured to drive the inkjet head based on an image data to eject the ink from the respective nozzles onto a print medium for each line extending in the predetermined direction and perform printing; and
a temperature detector configured to detect at least one temperature of an ink temperature, an environmental temperature around the inkjet head, or a temperature of the inkjet head,
wherein the controller is configured to:
  calculate first density correction values;
  calculate second density correction values for the respective nozzles to print a second line of the image data, by using gray-level values of pixels in the second line of the image data corresponding to the respective nozzles and by using the first density correction values for the respective nozzles to print a first line of the image data printed immediately prior to the second line, the first density correction values being used for correcting gray-level values of the pixels in the first line of the image data corresponding to the respective nozzles,
  correct the gray-level values of the pixels in the second line of the image data corresponding to the respective nozzles, by using the calculated second density correction values;
  drive the inkjet head based on the image data with the corrected gray-level values of the pixels to eject the ink from the respective nozzles onto the print medium; and
  adjust the second density correction value for a first nozzle of the nozzles, by using the second density correction value for at least one second nozzle of the nozzles adjacent to the first nozzle; and
  adjust the second density correction values according to the at least one temperature detected by the temperature detector.

7. An inkjet printer, comprising:
an inkjet head including nozzles arranged in a predetermined direction, the nozzles configured to eject ink and print at least first and second lines of data; and
a controller configured to drive the inkjet head based on an image data to eject the ink from the respective nozzles onto a print medium for each line extending in the predetermined direction and perform printing;
wherein the controller is configured to:
  calculate first density correction values;
  calculate second density correction values for the respective nozzles to print a second line of the image data, by using gray-level values of pixels in the second line of the image data corresponding to the respective nozzles and by using the first density correction values for the respective nozzles to print a first line of the image data printed immediately prior to the second line, the first density correction values being used for correcting gray-level values of the pixels in the first line of the image data corresponding to the respective nozzles, correct the gray-level values of the pixels in the second line of the image data corresponding to the respective nozzles, by using the calculated second density correction values;

drive the inkjet head based on the image data with the corrected gray-level values of the pixels to eject the ink from the respective nozzles onto the print medium; and calculate the second density correction values by using a first constant determined according to a rate of variation of an ink ejection amount depending on an ink ejection frequency of each of the nozzles and a second constant determined according to a degree of variation of the ink ejection amount depending on the ink ejection frequency of each of the nozzles.

8. The inkjet printer according to claim 7, wherein the first constant becomes greater as the rate of variation of the ink ejection amount becomes slower, and the second constant becomes greater as the degree of variation of the ink ejection amount becomes greater.

* * * * *